United States Patent
Morris et al.

(10) Patent No.: US 12,386,709 B2
(45) Date of Patent: Aug. 12, 2025

(54) PERIODIC RESET OF GRAPHICS PROCESSOR UNIT IN SAFETY-CRITICAL GRAPHICS PROCESSING SYSTEM

(71) Applicant: Imagination Technologies Limited, Kings Langley (GB)

(72) Inventors: Philip Morris, Hertfordshire (GB); Mario Sopena Novales, Hertfordshire (GB); Jamie Broome, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/241,984

(22) Filed: Sep. 4, 2023

(65) Prior Publication Data
US 2023/0409432 A1    Dec. 21, 2023

Related U.S. Application Data

(63) Continuation of application No. 17/832,613, filed on Jun. 4, 2022, now Pat. No. 11,748,200, which is a (Continued)

(30) Foreign Application Priority Data

Sep. 30, 2019    (GB) .................................. 1914056

(51) Int. Cl.
*G06F 11/14*    (2006.01)
*G06F 11/07*    (2006.01)
(Continued)

(52) U.S. Cl.
CPC ...... *G06F 11/1441* (2013.01); *G06F 11/0751* (2013.01); *G06T 1/20* (2013.01); *G06T 15/005* (2013.01)

(58) Field of Classification Search
CPC ............. G06F 11/1441; G06F 11/0751; G06F 11/0721; G06F 11/0739; G06F 11/0793;
(Continued)

(56) References Cited

U.S. PATENT DOCUMENTS 5,482,050 A * 1/1996 Smokoff ................ A61B 5/339
   715/788
8,743,128 B2 * 6/2014 Wilson .................... H04M 1/00
   345/501

(Continued)

FOREIGN PATENT DOCUMENTS

CN    108762652 A    11/2018
CN    109831585 A    5/2019
(Continued)

*Primary Examiner* — Xuxing Chen
(74) *Attorney, Agent, or Firm* — Potomac Law Group, PLLC; Vincent M DeLuca

(57) ABSTRACT

A method of performing safety-critical rendering at a graphics processing unit within a graphics processing system, the method comprising: receiving, at the graphics processing system, graphical data for safety-critical rendering at the graphics processing unit; scheduling at a safety controller, in accordance with a reset frequency, a plurality of resets of the graphics processing unit; rendering the graphical data at the graphics processing unit; and the safety controller causing the plurality of resets of the graphics processing unit to be performed commensurate with the reset frequency.

20 Claims, 4 Drawing Sheets

Related U.S. Application Data continuation of application No. 17/037,889, filed on Sep. 30, 2020, now Pat. No. 11,379,309.

(51) Int. Cl.
*G06T 1/20* (2006.01)
*G06T 15/00* (2011.01)

(58) Field of Classification Search
CPC .. G06F 11/004; G06F 11/0796; G06F 30/392; G06T 1/20; G06T 15/005
See application file for complete search history.

(56) References Cited

U.S. PATENT DOCUMENTS

| | | | |
|---|---|---|---|
| 12,093,689 B2* | 9/2024 | Tsien | G06F 9/3005 |
| 2006/0145727 A1* | 7/2006 | Sribhashyam | H03K 5/1252 327/34 |
| 2008/0098205 A1 | 4/2008 | Dolve et al. | |
| 2012/0243517 A1 | 9/2012 | Aguirre et al. | |
| 2013/0103972 A1 | 4/2013 | Ozer et al. | |
| 2014/0325274 A1 | 10/2014 | Mueller | |
| 2015/0045083 A1 | 2/2015 | Nonin | |
| 2015/0235338 A1 | 8/2015 | Alla et al. | |
| 2017/0017378 A1* | 1/2017 | Wild | G06T 3/60 |
| 2018/0039580 A1 | 2/2018 | Schneider | |
| 2018/0048893 A1* | 2/2018 | Nishitsuji | H04N 19/176 |
| 2018/0285191 A1 | 10/2018 | Jahagirdar et al. | |
| 2019/0005269 A1 | 1/2019 | Regner et al. | |
| 2019/0068700 A1* | 2/2019 | Nandkishor | H04L 43/0817 |
| 2019/0196926 A1 | 6/2019 | Jong et al. | |
| 2022/0188193 A1* | 6/2022 | Qi | G06F 13/4282 |

FOREIGN PATENT DOCUMENTS

| | | |
|---|---|---|
| CN | 109978751 A | 7/2019 |
| JP | 2012198728 A | 10/2012 |
| JP | 2014198170 A | 10/2014 |
| JP | 2015035666 A | 2/2015 |
| JP | 2015126807 A | 7/2015 |
| JP | 2016083120 A | 5/2016 |
| JP | 2018175337 A | 11/2018 |

* cited by examiner

PERIODIC RESET OF GRAPHICS PROCESSOR UNIT IN SAFETY-CRITICAL GRAPHICS PROCESSING SYSTEM

CROSS-REFERENCE TO RELATED APPLICATIONS AND CLAIM OF PRIORITY

This application is a continuation under 35 U.S.C. 120 of copending application Ser. No. 17/832,613 filed Jun. 4, 2022, now U.S. Pat. No. 11,748,200, which is a continuation of prior application Ser. No. 17/037,889 filed Sep. 30, 2020, now U.S. Pat. No. 11,379,309, which claims foreign priority under 35 U.S.C. 119 from United Kingdom Application No. 1914056.5 filed Sep. 30, 2019, the contents of which are incorporated herein by reference in their entirety.

BACKGROUND

The present disclosure relates to methods and graphics processing systems for performing safety-critical rendering.

In safety-critical systems, at least some of the components of the system must meet safety goals sufficient to enable the system as a whole to meet a level of safety deemed necessary for the system. For example, in most jurisdictions, seat belt retractors in vehicles must meet specific safety standards in order for a vehicle provided with such devices to pass safety tests. Likewise, vehicle tyres must meet specific standards in order for a vehicle equipped with such tyres to pass the safety tests appropriate to a particular jurisdiction. Safety-critical systems are typically those systems whose failure would cause a significant increase in the risk to the safety of people or the environment.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

Increasingly, data processing devices for safety-critical systems comprise a processor running software. Both the hardware and software elements must meet specific safety goals. Some software failures can be systematic failures due to programming errors or poor error handling. These issues can typically be addressed through rigorous development practices, code auditing and testing protocols. Even if systematic errors could be completely excluded from a safety-critical system, random errors can be introduced into hardware, e.g. by transient events (e.g. due to ionizing radiation, voltage spikes, or electromagnetic pulses). In binary systems transient events can cause random bit-flipping in memories and along the data paths of a processor. The hardware may also have permanent faults.

The safety goals for a data processing device may be expressed as a set of metrics, such as a maximum number of failures in a given period of time (often expressed as Failures in Time, or FIT), and the effectiveness of mechanisms for detecting single point failures (Single Point Failure Mechanisms, or SPFM) and latent failures (Latent Failure Mechanisms, or LFM). There are various approaches to achieving safety goals set for data processing devices: for example, by providing hardware redundancy so that if one component fails another is available to perform the same task, or through the use of check data (e.g. parity bits or error-correcting codes) to allow the hardware to detect and/or correct for minor data corruptions.

For example, data processors can be provided in a dual lockstep arrangement 100 as shown in FIG. 1 in which a pair of identical processing cores 101 and 102 are configured to process a stream of instructions 103 in parallel. The output of either one of the processing cores (101) may be used as the output 104 of the lockstep processor. When the outputs of the processing cores 101 and 102 do not match, a fault can be raised to the safety-critical system. A delay 105 can be introduced on the input to one of the cores so as to improve the detection probability of errors induced by extrinsic factors such as ionizing radiation and voltage spikes (with typically a corresponding delay 106 being provided on the output of the other core). However, since a second processing core is required, dual lockstep processors are expensive in that they necessarily consume double the chip area compared to conventional processors and consume approximately twice the power.

Advanced driver-assistance systems and autonomous vehicles may incorporate data processing systems that are suitable for such safety-critical applications which have significant graphics and/or vector processing capability, but the increases in the area and power consumption (and therefore cost) of implementing a dual lockstep processor might not be acceptable or desirable. For example, driver-assistance systems often provide computer-generated graphics illustrating hazards, lane position, and other information to the driver. Typically, this will lead the vehicle manufacturer to replace a conventional instrument cluster with a computer-generated instrument cluster which also means that the display of safety-critical information such as speed and vehicle fault information becomes computer-generated. Such processing demands can be met by graphics processing units (GPUs). However, in the automotive context, advanced driver-assistance systems typically require a data processing system which meets ASIL level B of ISO 26262.

For example, in the automotive context, graphics processing systems may be used to render an instrument cluster for display at a dashboard display screen. The instrument cluster provides critical information to the driver, such as vehicle speed and details of any vehicle faults. It is important that such critical information is reliably presented to the driver and vehicle regulations would typically require that the critical information is rendered in a manner which satisfies a predefined safety level, such as ASIL B of the ISO 26262 standard.

FIG. 2 illustrates an instrument cluster 200. The instrument cluster comprises a speedometer 202 in the form of a traditional dial having speed values 208 around the edge of the dial and a needle 207 whose angular orientation indicates the current speed of the vehicle. The instrument cluster further comprises an oil temperature gauge 203, an information icon 204 (e.g. indicating the selected radio station), a non-critical warning icon 205 (e.g. indicating a fault with the air conditioning system), and a critical warning icon 206 (e.g. indicating a serious engine problem). It may be necessary to render the instrument cluster 200 in a manner which satisfies a mandated safety level, such as ASIL B of the ISO 26262 standard.

Autonomous vehicles must in addition process very large amounts of data (e.g. from RADAR, LIDAR, map data and vehicle information) in real-time in order to make safety-critical decisions. Graphics processing units can also help meet such processing demands but safety-critical systems in autonomous vehicles are typically required to meet the most stringent ASIL level D of ISO 26262.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

According to a first aspect of the present invention there is provided a method of performing safety-critical rendering at a graphics processing unit within a graphics processing system, the method comprising: receiving, at the graphics processing system, graphical data for safety-critical rendering at the graphics processing unit; scheduling at a safety controller, in accordance with a reset frequency, a plurality of resets of the graphics processing unit; rendering the graphical data at the graphics processing unit; and the safety controller causing the plurality of resets of the graphics processing unit to be performed commensurate with the reset frequency.

Scheduling may comprise generating an instruction comprising a command indicating one or more scheduled resets of the graphic processing unit; and causing the instruction to be passed to the graphics processing unit.

The method may further comprise, in response to receiving the instruction comprising the command at the graphics processing unit: completing the processing of any task that had begun processing on the graphics processing unit prior to reading the instruction; and resetting at least part of the graphics processing unit.

The command indicating the scheduled reset of the graphics processing unit may be provided with a graphics processing instruction.

The reset frequency may define a number of resets to be performed per a number of frames.

The reset frequency may be set at design-time, user-configurable or determined by an application running on a device external to the graphics processing unit.

The method may further comprise monitoring one or more of a safety metric of the graphics processing unit, ionizing radiation levels, an occurrence of voltage spikes and an occurrence of electromagnetic pulses; and adapting the reset frequency in dependence on said monitoring.

The graphics processing unit may comprise one or more processing units, firmware and at least one of a cache, a register or a buffer, and at least one reset may be a soft reset comprising reinitialising the one or more processing elements and invalidating at least one entry within the cache, register or buffer at the graphics processing unit, and not reinitialising the firmware of the graphics processing unit.

The graphics processing unit may comprise one or more processing units, firmware and at least one of a cache, a register or a buffer, and at least one reset may be a hard reset comprising reinitialising the one or more processing elements, reinitialising the firmware of the graphics processing unit, and invalidating at least one entry within the cache, register or buffer at the graphics processing unit.

A plurality of soft resets may be scheduled in accordance with a soft reset frequency and a plurality of hard resets may be scheduled in accordance with a hard reset frequency. The soft reset frequency may be higher than the hard reset frequency.

According to a second aspect of the present invention there is provided a graphics processing system comprising a graphics processing unit configured to perform safety-critical rendering and a safety controller for the graphics processing system, in which: the graphics processing system is configured to receive graphical data for safety-critical rendering at the graphics processing unit; the safety controller is configured to schedule, in accordance with a reset frequency, a plurality of resets of the graphics processing unit; the graphics processing unit is configured to render the graphical data; and the safety controller is configured to cause the plurality of resets of the graphics processing unit to be performed commensurate with the reset frequency.

The reset frequency may define a number of resets to be performed per a number of frames.

The safety controller may comprise a monitor configured to monitor one or more of a safety metric of the graphics processing unit, ionizing radiation levels, an occurrence of voltage spikes and an occurrence of electromagnetic pulses, and the safety controller may be configured to adapt the reset frequency in dependence on said monitoring.

The graphics processing unit may comprise one or more processing units, firmware and at least one of a cache, a register or a buffer, and at least one reset may be a soft reset comprising reinitialising the one or more processing elements and invalidating at least one entry within the cache, register or buffer at the graphics processing unit, and not reinitialising the firmware of the graphics processing unit.

The graphics processing unit may comprise one or more processing units, firmware and at least one of a cache, a register or a buffer, and at least one reset may be a hard reset comprising reinitialising the one or more processing elements, reinitialising the firmware of the graphics processing unit, and invalidating at least one entry within the cache, register or buffer at the graphics processing unit.

The safety controller may be configured to schedule a plurality of soft resets in accordance with a soft reset frequency and to schedule a plurality of hard resets in accordance with a hard reset frequency. The soft reset frequency may be higher than the hard reset frequency.

In some examples, there is provided a graphics processing system comprising: a graphics processing unit for processing safety-critical data; and a safety controller configured to implement a safety mechanism for the graphics processing unit, wherein the safety controller comprises a monitor configured to monitor a level of ionizing radiation, and wherein the safety controller is configured to adapt the safety mechanism in dependence on the level of ionizing radiation.

In particular, implementing the safety mechanism may involve scheduling periodic resets of the graphics processing unit. As such, there may be provided a graphics processing system comprising: a graphics processing unit for processing safety-critical data; and a safety controller configured to schedule resets of the graphics processing unit in accordance with a reset frequency, wherein the safety controller comprises a monitor configured to monitor a level of ionizing radiation, and wherein the safety controller is configured to adapt the reset frequency in dependence on the level of ionizing radiation.

The graphics processing system may be embodied in hardware on an integrated circuit. There may be provided a method of manufacturing, at an integrated circuit manufacturing system, the graphics processing system. There may be provided an integrated circuit definition dataset that, when processed in an integrated circuit manufacturing system, configures the system to manufacture the graphics processing system. There may be provided a non-transitory computer readable storage medium having stored thereon a computer readable description of an integrated circuit that, when processed in an integrated circuit manufacturing system, causes the integrated circuit manufacturing system to manufacture the graphics processing system.

There may be provided an integrated circuit manufacturing system comprising: a non-transitory computer readable storage medium having stored thereon a computer readable integrated circuit description that describes the graphics processing system; a layout processing system configured to process the integrated circuit description so as to generate a circuit layout description of an integrated circuit embodying the graphics processing system; and an integrated circuit generation system configured to manufacture the graphics processing system according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

The present disclosure relates to methods and graphics processing systems for performing safety-critical rendering.

Figure 2:
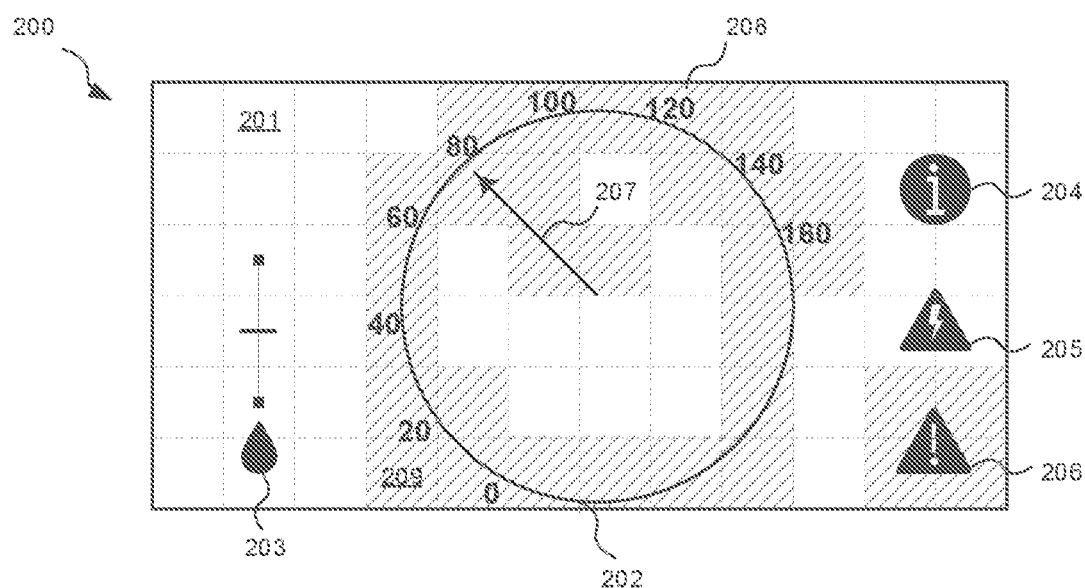
FIG. 2 shows a computer-generated instrument cluster for a vehicle.
Figure 3:
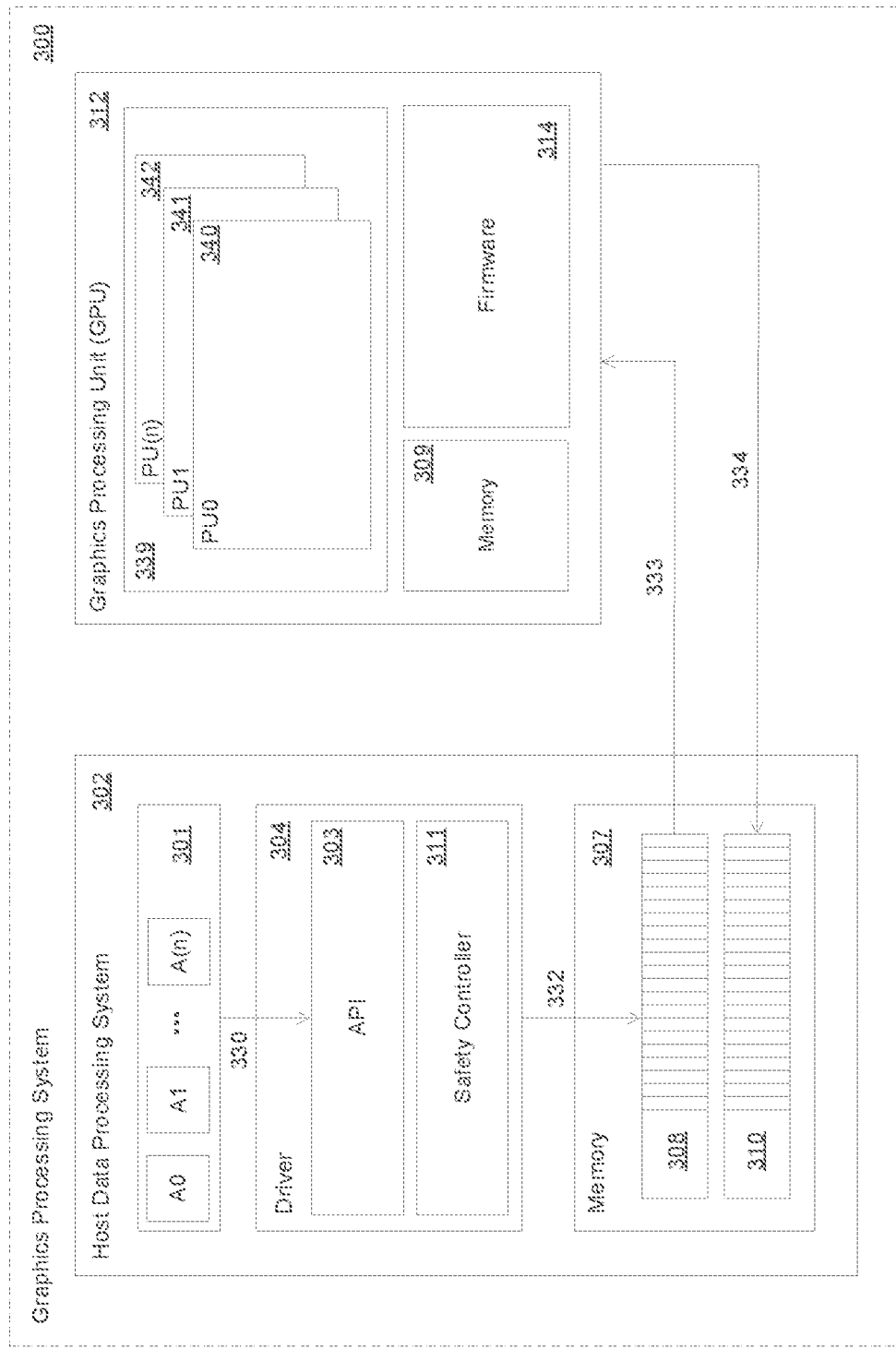
FIG. 3 is a schematic diagram of a graphics processing system for operation in accordance with the principles described herein.

A graphics processing system 300 is shown in FIG. 3. Graphics processing system 300 comprises at least one graphics processing unit (GPU) 312. GPU 312 may be suitable for rendering the instrument cluster 200 shown in FIG. 2. GPU 312 may comprise hardware components (e.g. hardware processing units) and software components (e.g. firmware, and the procedures and tasks for execution at the hardware processing units). The operation and arrangement of the GPU units will vary depending on the particular architecture of the GPU.

GPU 312 may comprise one or more processing units 339, labelled in the figure as PU0 340, PU1 341 to PU(n) 342. There may be any number of processing units. GPU 312 may also comprise memory 309. Memory 309 may comprise any kind of data stores, including, for example, one or more caches, buffers and/or registers accessible to the one or more processing units 339. GPU 312 also comprises processing logic for executing firmware 314 which may, for example, perform low-level management of the GPU and provide an interface for instructions directed to the GPU. In some arrangements, GPU 312 may be configured to execute software in the form of functions, routines and other code arranged for execution at units of the GPU (e.g. its processing units 339 and/or firmware 314). GPU 312 may comprise various other functional elements for, by way of example, processing data, communicating with external devices such as host data processing system 302, and supporting the processing performed at the one or more processing units 339.

Graphics processing system 300 may also comprise a driver 304 for the GPU 312. For example, the driver 304 could be a software driver supported at a data processing system at which the GPU 312 is provided. The driver 304 may provide an interface to the GPU for processes (e.g. software applications) running at a data processing system. In the example shown in FIG. 3, graphics processing system 300 comprises a host data processing system 302. One or more processes 301 may run on host data processing system 302. These processes are labelled in FIG. 3 as A0, A1, A(n). There may be any number of processes 301 running on the host data processing system. One or more processes 301 may interact 330 with the GPU 312 by means of the driver 304. The host data processing system 302 may comprise one or more processors (e.g. CPUs—not shown) at which the processes and driver are executed. A graphics application programming interface (API) 303 (e.g. OpenGL) may be provided at the driver by means of which the processes can submit rendering calls. Driver 304 may be a software component of the host data processing system 302.

Figure 5:
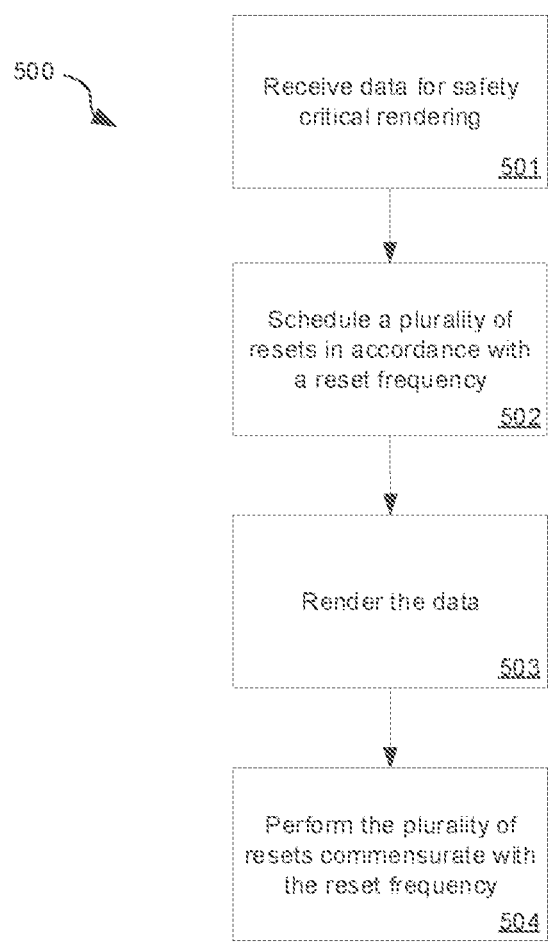
FIG. 5 is a flow diagram for a method of performing safety-critical rendering at a graphics processing unit in accordance with the principles described herein.

FIG. 5 is a flow diagram for a method of performing safety-critical rendering at a graphics processing system in accordance with the principles described herein. Graphical data for safety-critical rendering is received 501 at the graphics processing system. The API 303 may be arranged to receive draw calls from processes 301 so as to cause the GPU 312 to render a scene. For example, the API may be an OpenGL API and a process may be an application arranged to issue OpenGL draw calls so as to cause the GPU to render the instrument cluster shown in FIG. 2 to a display screen at the dashboard of a vehicle. Driver 304 also comprises a safety controller 311, which is discussed in further detail herein.

In the example depicted in FIG. 3, driver 304 generates command and/or control instructions so as to cause the GPU 312 to effect the draw calls submitted to the API by a process. The instructions may pass data defining the scene to be rendered to the GPU 312 in any suitable manner—e.g. as a reference to the data in memory. As shown in FIG. 3, said instructions may be sent 332 to one or more buffers 308 in memory 307. GPU 312 may read 333 instructions from memory 309. Memory 307 may be provided at host data processing system 302. Memory 307 may also include a buffer 310 for receiving 334 instructions returning from GPU 312. The buffers may be circular buffers.

Graphics processing unit 312 may be, for example, any kind of graphical and/or vector and/or stream processing unit. Graphics processing unit 312 may comprise a rendering pipeline for performing geometry processing and/or fragment processing of primitives of a scene. Each processing unit 339 may be a different physical core of a GPU.

The following examples are described with reference to tile-based rendering techniques, however it is to be understood the that graphics processing system could instead or additionally be capable of other rendering techniques, such as immediate mode rendering, or hybrid techniques that combine elements of both tile-based and immediate mode rendering.

A graphics processing system configured in accordance with the principles herein may have any tile-based architecture—for example, the system could be operable to perform tile based deferred rendering. Each processing unit 339 depicted in FIG. 3 may be able to process a tile independently of any other processing unit and independently of any other tile.

Tile-based rendering systems use a rendering space which is subdivided into a plurality of tiles. As is known in the art, tiles can be any suitable shape and size, e.g. rectangular (including square) or hexagonal. A tile of the rendering space may relate to a portion of a render target, e.g. representing a frame which is to be rendered at a graphics processing system. A frame may be all or part of an image or video frame. In some examples, the render output is not a final image to be displayed, but instead may represent something else, e.g. a texture which can subsequently be applied to a surface when rendering an image which includes that texture. In the examples described below, the render output is a frame representing an image to be displayed, but it is to be understood that in other examples, the render output can represent other surfaces, such as textures or environment maps, etc.

Tile-based rendering systems generally perform two distinct phases of operation: (i) a geometry processing phase in which geometry (e.g. primitives) is processed to determine, for each tile of the rendering space, which items of geometry may be relevant for rendering that tile (e.g. which primitives at least partially overlap the tile), and (ii) a rendering phase (or "fragment processing phase") in which geometry relevant for rendering a particular tile is processed so as to render the tile—for example, to produce pixel values for the pixel positions in the tile, which can then be output from the rendering system, e.g. for storage in a buffer (such as a frame buffer) and/or for display. Processing geometry relevant to a tile may comprise, for example, generating primitive fragments by sampling the primitives at the sample positions of the tile, and determining which of the fragments are visible and determining how the fragments affect the appearance of the pixels. There may be a one-to-one relationship between the sample positions and the pixels. Alternatively, more than one sample position may relate to each pixel position, such that the final pixel values can be produced by combining rendered values determined for a plurality of sample positions. This can be useful for implementing anti-aliasing.

A graphics processing unit (such as GPU 312) may be configured to perform part or all of any aspect of graphics processing in the geometry processing phase and in the rendering phase, including, for example, tiling, geometry processing, texture mapping, shading, depth processing, vertex processing, tile acceleration, clipping, culling, primitive assembly, colour processing, stencil processing, anti-aliasing, ray tracing, pixelization and tessellation.

Geometry processing logic and fragment processing logic may share resources of a graphics processing unit (such as GPU 312). For example, the processing units of a graphics processing unit (such as processing units 339 of GPU 312) may be used to implement part of both the geometry processing logic and the fragment processing logic, e.g. by executing different software instructions on execution units of the processing units. Processing units (such as processing units 339) may be configured to perform SIMD processing.

A graphics processing system configured in accordance with the principles described herein may be arranged to render any kind of scene.

Geometry Processing

Geometry processing may be performed at a graphics processing unit (such as GPU 312) in order to process geometry data submitted to it. The geometry data may represent the elements of a scene to be rendered. The geometry data may represent a plurality of items of geometry in the scene including, for example, one or more of: primitives to be rendered (e.g. described by vertex data describing vertices of the primitives in the scene), patches to be tessellated, and other objects to be rendered. For example, the geometry data may comprise sets of one or more primitives representing the respective display elements of the instrument cluster shown in FIG. 2. Each set of primitives may be created by means of a suitable draw call from a software application 301. A primitive may be a fundamental geometric shape from which the objects or other parts of a scene may be constructed. A primitive may be, for example, a triangle, a line, or a point.

The geometry processing may be performed at any suitable units of a GPU—for example, at one or more tiling engines (not shown in FIG. 3), and/or one or more processing modules executed on processing units (such as processing units 339). The tiling engines may be implemented in fixed-function hardware, software, or any combination thereof.

Geometry data (e.g. as generated in response to draw calls from an application 301) may be held in memory (such as memory 307) and read into a GPU's memory (such as memory 309 of GPU 312) for processing by that GPU. The geometry phase transforms the geometry data describing the elements (e.g. primitives) of a scene so as to form processed geometry data representing the scene from the point of view of the frame to be rendered. The geometry phase processing may perform any suitable processing on the geometry data, including, for example, vertex processing (e.g. vertex shading), clipping, projection, culling and tiling.

Geometry data received for processing at a graphics processing unit (such as GPU 312) may comprise elements (e.g. objects, primitives or other parts of a scene to be rendered) which are safety critical. An application (such as application 301) submitting geometry to a GPU may submit batches of geometry to be rendered, where each batch either does or does not comprise safety critical elements. The firmware (such as firmware 314) of a GPU may know what geometry is safety-critical and what is not, but the hardware need not be aware of which geometry is safety-critical.

Geometry processing typically comprises processing geometry data (e.g. as performed by instructions executed at the processing units 339) so as to transform the items of geometry submitted for processing (e.g. primitives formed from vertices) into screen space and to perform any necessary shading on the geometry, such as vertex shading, and clipping and/or culling based on whether the transformed primitives lie within the view frustum within the scene from the viewpoint. Tessellation may be performed in this stage to determine tessellated primitives from input patches, e.g. by performing vertex shading, hull shading, determining tessellation factors, domain shading and geometry shading.

In examples described herein, geometry processing is performed in respect of a complete frame to be rendered, rather than being performed on a tile-by-tile basis. This is because until the geometry is processed it is not known, for example, where the elements of the scene are located in relation to the tiles of the frame to be rendered, the apparent size of the elements, and whether those elements are visible.

Tiling may be performed on the processed geometry data so as to determine for each tile which primitives are relevant for rendering the tile, and storing associations between primitives and tiles in memory so as to identify the primitives relevant for rendering each given tile. Tiling may include generating for each tile a list (a tile list) of the elements (e.g. primitives) that fall within that tile. Such a tile list may comprise any data organised in any suitable form that indicates which elements are included in which tiles. For example, each tile might have a tile list which indicates all of the primitives which are relevant for rendering that tile (i.e. those primitives which overlap with that tile). The output of the geometry processing phase (e.g. the tile lists and the transformed and/or otherwise manipulated geometry) may be stored in memory 309 for use in the fragment processing phase. The output of the geometry processing phase may be referred to as parameter data.

Tiling may be performed at one or more tiling engine (not shown). Each tiling engine may be configured to operate on processed geometry data received from modules executing at processing units (such as processing units 339). In some examples, the tiling of the processed geometry data into tiles may be performed at the processing units. Tiling may be performed according to any suitable algorithm—for example, using perfect tiling, a bounding box approach or a hierarchical tiling approach. Many such algorithms are known and will not be discussed further herein. A tile may be considered to include an element of a scene when any part of that element is calculated by the tiling algorithm to overlap with any part of the area of the tile—for example, when an element overlaps with all or part of any of the pixels of the tile.

In some examples, some or all of the processed geometry data (e.g. transformed vertex data) for a scene may be stored in a memory (e.g. system memory, which may be situated "off-chip" with respect to the chip on which the GPU 312 is implemented). The system memory may be memory 307 shown in FIG. 3, or may be a different memory which is not shown in FIG. 3. In some examples, some or all of the processed geometry data for a scene may be stored locally to GPU 312, e.g. in memory 309. For each tile of a frame to be rendered, a list of the elements (e.g. the primitives) that overlap with that tile may be stored as a tile list. The tile list may refer to the transformed elements in the processed geometry data for the scene, avoiding duplicating storage of processed geometry data for such elements (e.g. due to elements of the scene overlapping more than one tile). In other examples, some or all of the processed geometry data required to perform fragment processing of each tile may be stored separately for each tile.

The processed data from the geometry phase may be stored at any suitable location for subsequent use in the fragment processing phase. For example, with reference to FIG. 3, the output of geometry processing (such as transformed vertex data and tile lists) may be stored in system memory (e.g. at a parameter buffer) and may be accessed, through a cache in memory 309, by the processing units 339 of the GPU 312 which are arranged to perform fragment processing. In some examples the processed data from the geometry phase may be held at a processing unit 339 and/or at a cache comprised in memory 309 instead of (or in addition to) storing the processed data from the geometry phase in the system memory.

Fragment Processing

Fragment processing is performed on the output of the geometry processing phase (e.g. the tile lists and transformed geometry data). Fragment processing may be performed at any suitable units of the GPU—for example, at one or more of a rasteriser, a Hidden Surface Removal (HSR) unit, a texture filtering unit and one or more shader units. These units are not shown in FIG. 3. One or more of the units may be implemented as software executing on the processing units. In some examples, one or more of the rasteriser, the Hidden Surface Removal (HSR) unit, shader units and the texture filtering unit may be implemented in fixed-function hardware. More generally, any of the functional units could be implemented in hardware, software, or any combination thereof. Implementing a functional module in hardware (e.g. fixed-function circuitry) is generally relatively more efficient in terms of processing power and latency but relatively inflexible, whereas implementing a functional module in software is relatively less efficient in terms of processing power and latency but is relatively flexible in terms of being able to alter the operation of the module after the hardware design process.

In some examples, the tile list is fetched for each given tile to be rendered and the transformed primitive data is fetched which is indicated by that tile list as being relevant to the fragment processing of that tile. Fragment processing may comprise one or more of: texture processing, shader processing, rasterization, hidden surface removal, and alpha processing. Fragment processing may be performed at one or more units (e.g. arranged in a pipeline) for performing different aspects of the fragment processing.

Rasterisation (e.g. scan conversion) may be performed in order to identify which sample positions each primitive covers and to generate primitive fragments at those sample positions. A primitive fragment represents values of a primitive (e.g. depth, texture co-ordinates, etc.) at a particular sample position. Typically, until rasterisation is performed, primitives are defined in terms of their vertices.

Hidden surface removal (HSR) may be performed during fragment processing in which depth comparisons are made at each sample position to determine which primitive fragment is visible at each sample position.

Shading and/or texturing may be performed during fragment processing. A colour value may be determined for a sample position for a primitive fragment which has been identified as being visible at that sample position, e.g. by running a shader program for the primitive fragment which may involve fetching a texture sample based on a texture co-ordinate. Texture filtering may be performed. Fetching a texture sample might involve the texture filtering unit performing filtering (e.g. bilinear filtering, trilinear filtering, or anisotropic filtering, on a group of texels of a stored texture)—for example in cases when the desired texture co-ordinate lies between texels of the texture.

The above paragraphs describe a "deferred" rendering approach in the sense that the hidden surface removal is performed before the shading/texturing. In other examples, rendering may be performed which is not deferred.

The output of calculations performed during fragment processing may be written to one or more buffers in memory—for example, one or more of: a colour buffer for storing colour values (e.g. of pixels), a depth buffer for storing depth values (e.g. of pixels) and a stencil buffer for storing an indication as to which parts (e.g. pixels) of a tile are to be rendered. Such buffers may be maintained in any manner appropriate to the GPU architecture, including at one or more of a system memory and/or a GPU cache in memory (such as memory 309). The use of such buffers is well known in the art and will not be discussed in detail here.

A graphics processing system configured in accordance with the principles of the present disclosure is operable to render frames that include safety critical display elements, such as the instrument cluster of FIG. 2.

Periodic Reset

Random errors can be introduced into hardware by transient events such as ionizing radiation, voltage spikes, and electromagnetic pulses. In binary systems transient events can cause random bit-flipping in memories and along the data paths of a processor. Transient errors may cause safety critical faults. For example, a bit-flip may corrupt data in memory causing one or more pixel values to be inverted. With reference to the instrument cluster shown in FIG. 2, an inverted pixel value could cause a critical warning icon (e.g. 206) to be displayed incorrectly. In another example, a transient error may corrupt the configuration data for a GPU. The corruption of GPU configuration data may affect the rendering of any or all data subsequently provided to that GPU. Transient errors can have dangerous consequences when they affect the rendering of safety-critical graphics— for example, by causing safety critical warning icons to provide incorrect or incomplete information to a vehicle user.

In order to mitigate the effect of transient faults on safety-critical rendering, in accordance with the principles described herein, a graphics processing system is configured to periodically reset a graphics processing unit configured to perform safety critical rendering.

Returning to FIG. 3, a graphics processing system 300 in accordance with the principles described herein comprises at least one graphics processing unit (GPU) 312. The graphics processing system 300 also comprises a safety controller 311. Safety controller 311 may be embodied in hardware (e.g. fixed-function hardware), software or any combination thereof (e.g. as a software process running at general purpose hardware). Safety controller 311 may be in communication with GPU 312. Safety controller 311 may communicate with GPU 312 in any suitable manner. Safety controller 311 may be present in any suitable location. In one example, safety controller 311 and GPU 312 may be part of the same system on chip architecture. In FIG. 3, safety controller 311 is shown as being comprised within host data processing system 302. Safety controller 311 may be a component of driver 304, which provides an interface to the GPU 312 for processes (e.g. software applications) running at the host data processing system 302. Safety controller 311 is configured to schedule periodic resets for graphics processing unit 312.

FIG. 5 is a flow diagram for a method of performing safety-critical rendering at a graphics processing unit in accordance with the principles described herein. A plurality of resets of the GPU 312 are scheduled 502 in accordance with a reset frequency by safety controller 311. Said resets are referred to herein as periodic resets. Periodic resets may be scheduled and performed independently of any fault being detected. That is, periodic resets may be scheduled in advance of when they are to be performed.

Resetting a GPU may limit the persistence of certain faults present on that GPU by returning the GPU to a known safe state. A reset may involve returning some or all of the GPU flip-flops to a known safe state, and/or invalidating some or all data stored in memory within the GPU. Thus, a reset may curtail (i.e. limit the persistence of) transient errors, such as those resulting from random bit-flipping in memory.

Figure 1:
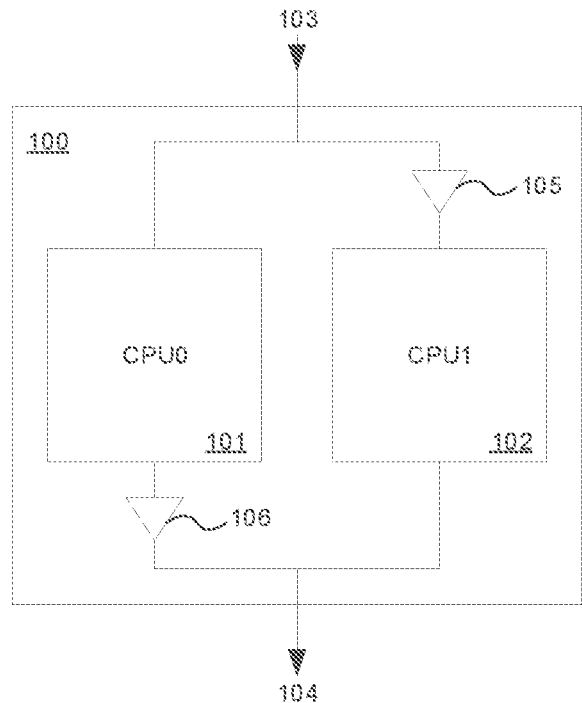
FIG. 1 is a schematic diagram of a conventional dual lockstep processor.

This approach is advantageous over performing resets only in response to detecting a fault. Some faults may be difficult or impossible to detect. For example, detecting a transient fault may require a dual-lockstep type arrangement to be implemented—as described with reference to FIG. 1. In such an arrangement, a pair of identical processing cores 101 and 102 are configured to process a stream of instructions 103 in parallel. The outputs of the processing cores 101 and 102 can be compared. When the outputs of the processing cores 101 and 102 do not match, a fault can be raised to the safety-critical system. However, since a second processing core is required, dual lockstep processors are expensive in that they necessarily consume double the chip area compared to conventional processors and consume approximately twice the power. That said, it is to be understood that the method of performing safety-critical rendering at a graphics processing unit in accordance with the principles described herein may be used in combination with such approaches. This may be appropriate for graphics processing systems with highly-stringent safety requirements. For example, periodic resets may be scheduled in accordance with the principles described herein for one or both of processing cores 101 and 102 in a dual lockstep arrangement.

As described herein, a plurality of resets of a graphics processing unit (such as GPU 312) are scheduled 502 by safety controller (such as safety controller 311) in accordance with a reset frequency. In an example, the reset frequency may be defined by a number of resets to be performed per a number of frames to be processed or a number of resets to be performed per a number of tiles to be processed. For example, the reset frequency may be one reset per 20 frames. The reset frequency could be any value, and in an extreme case a reset may be scheduled after every frame. With reference to FIG. 3, safety controller 311 may comprise a frame counter (not shown). The frame counter may be incremented each time the driver 304 instructs the rendering of a frame. The safety controller may schedule a reset each time the frame counter reaches the predetermined number of frames. The frame counter can then be reset (i.e. set to zero).

In another example, the reset frequency may be a temporal frequency. That is, the reset frequency may define a number of resets to perform per unit of time. For example, the average human response time is typically in the region of 200 to 215 ms, and so the reset frequency may be one reset per 200 ms. That is, the reset frequency may be set in dependence on the average human response time so that a transient error can be corrected before human users are able to take action in response to it. The reset frequency need not depend on the average human response time and could in fact be any value. With reference to FIG. 3, safety controller 311 may comprise a recurring timer (not shown). The safety controller may schedule a reset each time the recurring timer expires.

A performance cost is associated with resetting a GPU. That is, for the duration of a reset a GPU may be unable to perform any processing task. The duration of a reset may be the time between (i) that reset being initiated and (ii) the next processing instruction being read after the reset has completed. That is, the time in which the reset itself is being performed. In addition, after a reset has been completed data stored in a GPU's local memory (such as memory 309) is invalid, meaning that the GPU must access any data it requires from a main system memory (e.g. memory 307 in host data processing system 302) until said data has been re-written into its local memory. Reading data from a main system memory (e.g. memory 307) is typically slower than accessing data stored locally (e.g. in memory 309). The time delay caused by resetting a GPU may cause the throughput of that GPU to be reduced and/or the latency experienced by graphical data to be processed by the GPU to increase. There is a trade-off in setting the reset frequency, such that the resets are frequent enough to prevent transient errors from persisting for an amount of time that would be perceived negatively by a user viewing the rendered frames, but also such that the resets are not so frequent as to have a negative effect on the perceived performance of the graphics processing system (e.g. by increasing the latency of the rendering performed by the GPU). This trade-off may be assessed differently in different implementations, and can be adjusted accordingly. For example, if the graphics processing system is rendering images for a car dashboard, the reset frequency may be set to be relatively high because reducing the persistence of errors is more important than improving the rendering performance; whereas, if the graphics processing system is rendering images for a fast-moving, high-resolution video game for example, the reset frequency may be set to be relatively low because the rendering performance may be considered to be more important than reducing the persistence of errors.

The reset frequency may be predetermined. For example, the reset frequency may be set at design time. The reset frequency may be set at design time for the graphics processing system, or for individual graphics processing units included in the graphics processing system. Alternatively, the reset frequency may be user-configurable. A user may set a desired reset frequency when setting up an application 301 for running on the host data processing system 302. In another example, the desired reset frequency may be determined by an application 301 running on the host data processing system 302. An application may communicate said desired reset frequency to the safety controller (e.g. in the example shown in FIG. 3, via API 303 in driver 304).

Returning to FIG. 3, multiple applications 301 (e.g. A0, A1 to A(n)) may be running on the host data processing system 302. Each application 301 may communicate a desired reset frequency (e.g. as specified by their user or determined by the application itself). The desired reset frequency communicated by each application may not necessarily be the same. The safety controller may determine a reset frequency for scheduling periodic resets in dependence on any one or more of the desired reset frequencies communicated by the applications 301. For example, the safety controller 311 may schedule periodic resets in accordance with the highest of the reset frequencies desired by the applications. This is because the highest reset frequency generally allows transient errors to persist for the least amount of time, and may be required by the application having the most stringent safety requirements. In another example, the plurality of reset frequencies provided by the applications 301 may be mathematically combined (e.g. by averaging), with periodic resets being scheduled by the safety controller in accordance with the combined reset frequency.

The reset frequency may be adaptive. For example, an initial reset frequency may be predetermined, or determined by an application, as described herein. The initial reset frequency may be adapted in real-time in dependence on a level of confidence in the GPU on which safety critical rendering is being performed.

For example, the safety performance for a data processing device may be expressed by a set of safety metrics. Certain safety metrics can provide a measure of reliability in service (e.g. the reliability of a data processing device in use). One example of such a safety metric is a measurement of the rate at which the system detects errors. The methods of measuring such safety metrics are well-known to the person skilled in the art, and will not be discussed further herein. Safety controller 311 may monitor a safety metric of the GPU 312 and adapt the reset frequency in dependence on that safety metric. For example, the safety controller may monitor the rate at which errors are detected. In an example, the safety controller may increase the reset frequency in response to the rate of detected errors increasing, and vice versa.

As described herein, random errors can be introduced into hardware, e.g. by transient events (e.g. due to ionizing radiation, voltage spikes, or electromagnetic pulses). In an example, the safety controller 311 may measure the occurrence of one of more of these transient events, and adapt the reset frequency in dependence on that monitoring. For example, the level of ionizing radiation is known to be higher at higher altitudes, and is measurable using a device such as a Geiger-Muller counter. The safety controller may monitor the level of ionizing radiation and adapt the reset frequency in dependence on that level. For example, certain vehicles, such as aeroplanes, regularly operate at varying altitude. In a graphics processing system operable to render an instrument cluster (similar to the one shown in FIG. 2) for an aeroplane, the safety controller 311 may increase the reset frequency for the GPU 312 during flight owing to the higher levels of measurable ionizing radiation at increased altitude.

In another example, if an additional GPU reset has recently been performed in response to a detected fault (e.g. a fault detected using a dual lockstep type arrangement), the safety controller 311 may delay or cancel the next scheduled periodic reset.

A graphics processing unit (such as GPU 312) may comprise hardware components (e.g. hardware processing units 339 and memory 309) and software components (e.g. firmware 314, and the procedures and tasks for execution at the hardware processing units). The plurality of scheduled resets may comprise one or more different types of reset. For example, a reset may be a soft reset. A soft reset may comprise resetting the hardware components of the GPU 312. For example, during a soft reset, the processing units 339 may be re-initialised and returned to a known state, and any cache, register or buffer entries comprised in memory 309 may be invalidated. During a soft reset, the software components of the GPU 312, such as firmware 314, may continue to run. In contrast, a reset may be a hard reset. A hard reset may comprise resetting both the hardware and software components of GPU 312. For example, during a hard reset, the processing units 339 and firmware 314 may be re-initialised and returned to a known state, and all entries in memory 309 (including entries in any caches, registers or buffers) may be invalidated or cleared. Any other type of reset that comprises resetting any combination of the components of a graphics processing unit (such as GPU 312) is also possible.

In an example, the plurality of resets may comprise both soft resets and hard resets. In this example, soft resets and hard resets may be scheduled in accordance with different reset frequencies. For example, soft resets may be scheduled in accordance with a soft reset frequency. Hard resets may be scheduled in accordance with a hard reset frequency. The soft reset frequency may be higher than the hard reset frequency. The soft reset frequency may be one reset per 20 frames. The hard reset frequency may be one reset per 100 frames. The soft and hard reset frequencies could be any value. The applications 301 running at the host data processing system 301 may determine the type and frequency of resets to be performed.

The type of reset to be performed may be predetermined (e.g. for the graphics processing system at design-time or user-configurable at an application), determined (e.g. by an application) and may be adaptive in a similar manner to the reset frequency as described herein. For example, if the confidence level in a GPU decreases the hard reset frequency for that GPU may be increased.

In order to assert a scheduled reset on the GPU, the safety controller may generate an instruction comprising a command defining one or more scheduled resets of the GPU. The reset command may be provided to the GPU in any suitable manner—for example, as an instruction in a control stream comprising one or more commands. A reset command may be a discrete instruction. In some examples, a reset command may be embedded within a graphics processing instruction. The reset command may be embedded in the graphics processing instruction as a flag. For example, the flag may be present in an instruction header. Said instruction header may be in the kick command of the instruction. In the example shown in FIG. 3, a reset command defining a scheduled reset of GPU 312 may be sent 332 by the driver 304 into an instruction buffer 308. Said instruction may be queued in buffer 308 until it is read 333 into the GPU 312.

In response to receiving a reset command, a GPU may complete the processing of any task that had begun processing prior to receiving the reset command. The scheduled reset may then be performed. This has the advantage that partially completed processing work may not be wasted. That is, rather than immediately performing a reset on reading of a reset command, it can be more efficient to defer a reset until any partially completed processing tasks have been completed. This is because resetting a GPU before it has completed a partially completed processing task may lead to the entirety of said processing task having to be restarted after the reset—for example, because any intermediate processing results required to complete the processing of that task and being stored in memory during processing (e.g. a cache, register or buffer in memory 309) may be invalidated by the reset.

On receipt of a reset command, the GPU may defer beginning the processing of any new task(s) that had not begun processing prior to receiving the reset command until after the GPU reset has been completed.

In systems in which a reset is performed in response to a detection of a fault, the reset is performed as soon as possible after the detection of the fault because there is known to be a fault in the GPU, so the processing work that the GPU is currently working on may be faulty, and as such there is no reason to continue with this work. In contrast, the periodic resets described herein are scheduled irrespective of whether a fault has been detected. As such, when a periodic reset is scheduled, the GPU can continue with the work it is currently processing until a convenient time when the reset can be performed. This means that the detrimental effects on the GPU performance caused by the resets can be reduced or minimised.

Figure 4:
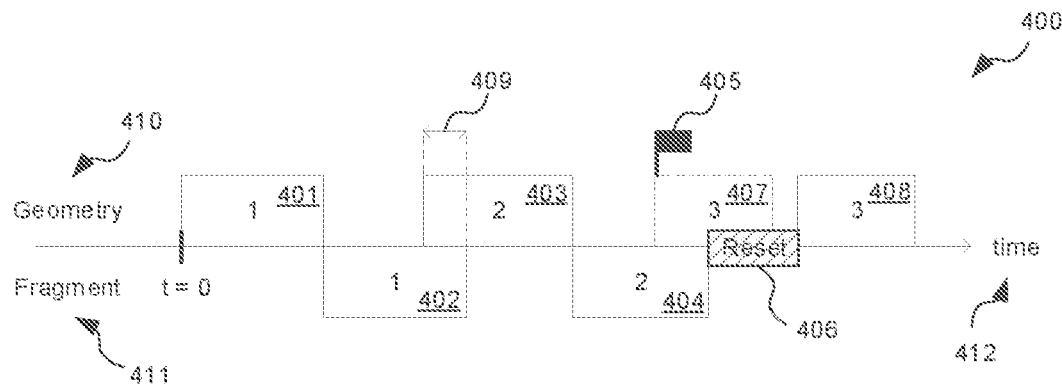
FIG. 4 is a schematic timeline showing a graphics processing unit reset in accordance with the principles described herein.

FIG. 4 is a schematic timeline 400 showing a graphics processing unit reset in accordance with the principles described herein. As described herein, tile-based rendering systems generally perform two distinct phases of operation: (i) a geometry processing phase in which geometry (e.g. primitives) is processed to determine, for each tile of the rendering space, which items of geometry may be relevant for rendering that tile (e.g. which primitives at least partially overlap the tile), and (ii) a fragment processing phase (or "rendering phase") in which geometry relevant for rendering a particular tile is processed so as to render the tile—for example, to produce pixel values for the pixel positions in the tile, which can then be output from the rendering system, e.g. for storage in a buffer (such as a frame buffer) and/or for display.

FIG. 4 schematically represents geometry processing 410 above the timeline axis 412, and fragment processing 411 below the timeline axis 412. At t=0 the geometry processing of a first frame 401 begins. Geometry processing of the first frame may be performed in accordance with the geometry processing principles described herein. Once the geometry processing of the first frame 401 has been completed, the fragment processing of the first frame 402 can begin. The geometry processing of a second frame 403 may also begin whilst the fragment processing of the first frame 402 is still ongoing. A GPU may be capable of performing geometry and fragment processing of different frames simultaneously. That is, the geometry processing of the second frame and the fragment processing of the first frame may overlap 409. In some examples, the geometry processing of a frame and the fragment processing of another frame may entirely overlap. Once the geometry processing of the second frame 403 has been completed, the fragment processing of the second frame 404 can begin. That is, as shown FIG. 5, data received at the graphics processing unit is rendered 503. Instructions for the processing of a third frame, comprising a flag 405 indicating the scheduled reset of the GPU, may be read whilst the fragment processing of the second frame 404 is being performed. In response to reading the instruction comprising the reset command, the GPU may complete the fragment processing of the second frame 404, and defer the geometry processing of the third frame (which would otherwise have occurred as shown by 407), before performing reset 406. Once reset 406 has completed, the GPU may begin processing the geometry processing of the third frame 408. Each received reset command may be handled in the same manner. In this way, as shown in FIG. 5, a safety controller performs 504 the plurality of resets commensurate with the reset frequency. That is, the safety controller causes the plurality of resets of the graphics processing unit to be performed based on the reset frequency, although the frequency with which resets of the graphics processing are performed may not precisely match the reset frequency in accordance with which resets are scheduled—for example, due to delays allowed to complete the processing of a partially processed task as described with reference to FIG. 4. In other words, the safety controller causes the plurality of resets of the graphics processing unit to be performed commensurate with the reset frequency such that the frequency with which resets of the graphics processing are performed is based on the reset frequency. To put it another way, the safety controller causes the plurality of resets of the graphics processing unit to be performed commensurate with the reset frequency such that the reset frequency is indicative of the frequency with which resets of the graphics processing are performed.

The efficiency of a GPU may be increased by performing both geometry processing and fragment processing simultaneously. This is because, as described herein, the geometry processing phase and fragment processing phase may be performed by different units of the GPU. Thus, overlapping the geometry processing and fragment processing of two different frames may ensure that more of the processing units of the GPU are being used at any one time. As shown in FIG. 4, deferring the geometry processing of a frame until after a scheduled reset means that such a GPU cannot take advantage of its ability to simultaneously perform the geometry processing of that frame and the fragment processing of another frame (e.g. a previous frame). This can be considered to be a further performance cost associated with performing resets in this manner.

FIG. 4 is schematic only, and it is to be appreciated that other types of processing (additional or alternative to geometry and fragment processing) may be performed by a graphics processing unit, such as compute processing handled by a Compute Data Master (CDM), or rendering geometry in a two-dimensional scene handled by a Two-dimensional Data Master (TDM).

As described herein, the reset flag may be present in an instruction header. An instruction may include a kick command for each of the geometry processing phase and the fragment processing phase of a frame. As shown in FIG. 4, the GPU (e.g. the firmware running at a GPU) may check for a reset flag in the instruction header before beginning the geometry processing phase—that is, before executing the kick command for the geometry processing phase. This can be advantageous because checking for a reset flag at this stage leads to scheduled resets being performed between frames. It is to be understood that it would also be possible to cause the GPU to instead check for a reset flag in the instruction header before beginning the fragment processing phase. As described herein, some or all of the output of the geometry processing phase may be stored in a memory external to the GPU—and so, in this case, said output may not be invalidated during a reset. In some cases, the output of the geometry phase may be stored in external memory as a set of independent tiles derived from each frame. Fragment processing may be performed on each tile independently. The GPU may access each of these tiles sequentially during fragment processing of a frame. In these cases, it may be possible to perform a reset between the fragment processing of two tiles. This is such an example in which the reset frequency may be defined by a number of resets to be performed per a number of tiles to be processed.

Referring again to FIG. 3, GPU 312 comprises one or more processing units 339, labelled in the figure as PU0 340, PU1 341 to PU(n) 342. There may be any number of processing units. Safety controller 311 may be capable of selectively scheduling periodic resets for individual processing units 339 of the GPU 312. The safety controller 311 may selectively schedule resets for only the individual processing units 339 performing safety critical rendering. In another example, although only one GPU 312 is shown in FIG. 3, there may be a plurality of GPU's associated with host data processing system 302. Safety controller 311 may be capable of selectively scheduling periodic resets for individual GPUs of said plurality of GPUs. The safety controller 311 may selectively schedule resets for only the GPUs performing safety critical rendering. Resets may be selectively scheduled for different processing units 339 or GPUs by addressing each of the graphics processing instructions including a reset command to a specific processing unit 339 or GPU.

For example, the instrument cluster 200 shown in FIG. 2 comprises a speedometer 202 in the form of a traditional dial having speed values 208 around the edge of the dial and a needle 207 whose angular orientation indicates the current speed of the vehicle. The instrument cluster further comprises an oil temperature gauge 203, an information icon 204 (e.g. indicating the selected radio station), a non-critical warning icon 205 (e.g. indicating a fault with the air conditioning system), and a critical warning icon 206 (e.g. indicating a serious engine problem). Only the speedometer 202 and the critical warning icon 206 of the display elements are critical to the safety of the vehicle and its occupants. It may be necessary to render those display elements in a manner which satisfies a mandated safety level, such as ASIL B of the ISO 26262 standard. The oil temperature gauge 203, information icon 204 and non-critical warning icon 205 do not need to be rendered to that safety level. The rendering space used to render the frame representing the rendered instrument cluster is divided into a plurality of tiles 201 each comprising a plurality of pixels. Only the highlighted tiles 209 include the critical display elements in that at least part of a critical display element overlaps with each of the highlighted tiles. The safety controller 311 may schedule periodic resets for only the processing unit(s) 339 or GPU(s) that are configured to perform the rendering of the highlighted tiles.

The graphics processing system of FIG. 3 is shown as comprising a number of functional blocks. This is schematic only and is not intended to define a strict division between different logic elements of such entities. Each functional block may be provided in any suitable manner. It is to be understood that intermediate values described herein as being formed by graphics processing system need not be physically generated by the graphics processing system at any point and may merely represent logical values which conveniently describe the processing performed by a graphics processing system between its input and output.

A graphics processing system described herein may be embodied in hardware on one or more integrated circuits. The graphics processing system described herein may be configured to perform any of the methods described herein.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, vector processor, tensor processor, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

There may be provided a method of manufacturing, at an integrated circuit manufacturing system, a graphics processing system as described herein. There may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 6.

Figure 6:
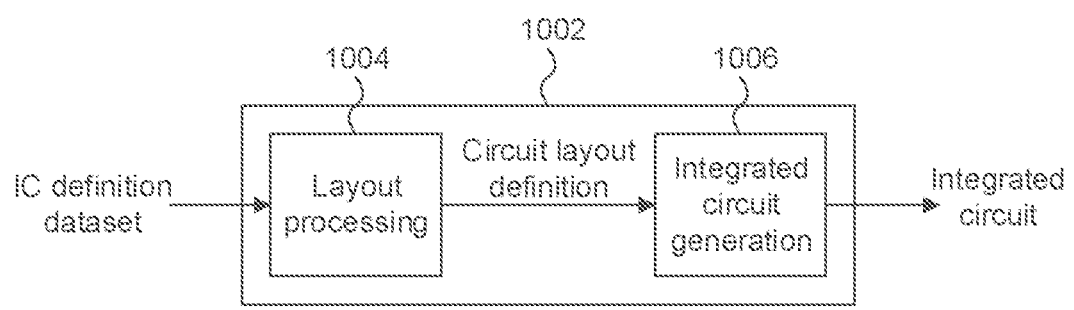
FIG. 6 is a schematic diagram of an integrated circuit manufacturing system.

FIG. 6 shows an example of an integrated circuit (IC) manufacturing system 1002 which is configured to manufacture a graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering an instrument cluster, using a tile-based rendering technique, at a graphics processing unit comprising a plurality of processing elements, the method comprising:
   scheduling, in accordance with a reset frequency, a plurality of resets of one or more processing elements of the plurality of processing elements that are used for rendering tiles that include safety critical information; and
   causing the plurality of resets to be performed commensurate with the reset frequency.

2. The method as claimed in claim 1, wherein each processing element of the plurality of processing elements is a core of the graphics processing unit.

3. The method as claimed in claim 1, wherein a command indicating a scheduled reset of a processing element is provided with a graphics processing instruction.

4. The method as claimed in claim 3, wherein the graphics processing instruction is addressed to the processing element that is to be reset.

5. The method as claimed in claim 1, wherein the instrument cluster comprises safety critical display elements and display elements that are not safety critical.

6. The method as claimed in claim 1, wherein the instrument cluster comprises at least one safety critical display element that comprises safety critical information.

7. The method as claimed in claim 1, further comprising:
   dividing the instrument cluster into a plurality of tiles; and
   identifying which tiles of the plurality of tiles comprise safety critical information.

8. The method as claimed in claim 1, wherein the reset frequency defines a number of resets to be performed per a number of frames.

9. The method as claimed in claim 1, wherein the reset frequency is set at design-time, user-configurable or determined by an application running on a device external to the graphics processing unit.

10. The method as claimed in claim 1, the method further comprising:
    monitoring one or more of a safety metric of the graphics processing unit, ionizing radiation levels, an occurrence of voltage spikes and an occurrence of electromagnetic pulses; and
    adapting the reset frequency in dependence on said monitoring.

11. The method as claimed in claim 1, comprising selectively scheduling a plurality of resets of only the one or more processing elements of the plurality of processing elements that are used for rendering tiles that include safety critical information.

12. The method as claimed in claim 1, wherein the scheduling and causing steps are performed by a safety controller external to the graphics processing unit.

13. A graphics processing system comprising:
    a graphics processing unit configured to render an instrument cluster, using a tile-based rendering technique, the graphics processing unit comprising a plurality of processing elements; and
    a safety controller for the graphics processing system, the safety controller being configured to:
       schedule, in accordance with a reset frequency, a plurality of resets of one or more processing elements of the plurality of processing elements that are configured to be used for rendering tiles that include safety critical information; and
       cause the plurality of resets to be performed commensurate with the reset frequency.

14. The graphics processing system as claimed in claim 13, wherein each processing element of the plurality of processing elements is a core of the graphics processing unit.

15. The graphics processing system as claimed in claim 13, wherein the instrument cluster comprises safety critical display elements and display elements that are not safety critical.

16. The graphics processing system as claimed in claim 13, wherein the instrument cluster comprises at least one safety critical display element that comprises safety critical information.

17. The graphics processing system as claimed in claim 13, the graphics processing unit being configured to:
    divide the instrument cluster into a plurality of tiles; and
    identify which tiles of the plurality of tiles comprise safety critical information.

18. The graphics processing system as claimed in claim 13, the safety controller being configured to selectively schedule resets of only the one or more processing elements of the plurality of processing elements that are configured to be used for rendering tiles that include safety critical information.

19. The graphics processing system as claimed in claim 13, wherein the safety controller comprises a monitor configured to monitor one or more of a safety metric of the graphics processing unit, ionizing radiation levels, an occurrence of voltage spikes and an occurrence of electromagnetic pulses, and wherein the safety controller is configured to adapt the reset frequency in dependence on said monitoring.

20. A non-transitory computer readable storage medium having stored thereon computer readable instructions that, when executed at a computer system, cause the computer system to perform a method of rendering an instrument cluster, using a tile-based rendering technique, at a graphics processing unit comprising a plurality of processing elements, the method comprising:

scheduling, in accordance with a reset frequency, a plurality of resets of one or more processing elements of the plurality of processing elements that are used for rendering tiles that include safety critical information; and causing the plurality of resets to be performed commensurate with the reset frequency.

* * * * *